United States Patent [19]

Anthony et al.

[11] 4,451,726

[45] May 29, 1984

[54] KILN TEMPERATURE CONTROL DEVICE

[75] Inventors: Frank H. Anthony, 1709 N. Hullen, Metarie, La. 70001; Vernon W. Coy, Metarie, La.

[73] Assignee: Frank H. Anthony, Metarie, La.

[21] Appl. No.: 381,371

[22] Filed: May 24, 1982

Related U.S. Application Data

[62] Division of Ser. No. 66,296, Aug. 13, 1979, Pat. No. 4,367,399.

[51] Int. Cl.³ .............................................. G01K 7/04
[52] U.S. Cl. .................................... 219/413; 374/134; 219/490
[58] Field of Search .............. 219/412, 413, 490, 516, 219/510, 511, 512, 513; 374/134; 236/15 BB, 15 BR

[56] References Cited

U.S. PATENT DOCUMENTS

| | | | |
|---|---|---|---|
| 1,563,104 | 11/1925 | Pedersen | 374/134 |
| 3,690,175 | 9/1972 | Butts | 374/134 |
| 3,964,313 | 6/1976 | Connick | 374/134 |

Primary Examiner—B. A. Reynolds
Assistant Examiner—Teresa J. Walberg
Attorney, Agent, or Firm—Cushman, Darby & Cushman

[57] ABSTRACT

A ceramic encased thermocouple placed within a kiln electrically controls an array of signal classifiers which, in turn, control the operation of the kiln heating elements. The temperature value at which the classifier array terminates the whole kiln heating operation is preselected as one of a plurality of discrete predetermined values corresponding to pyrometric cone temperature values.

1 Claim, 5 Drawing Figures

KILN TEMPERATURE CONTROL DEVICE

This is a division, of application Ser. No. 66,296 filed Aug. 13, 1979, now U.S. Pat. No. 4,367,399.

This invention generally relates to temperature control devices for kilns.

In the firing of ceramic ware in a household or hobbist's kiln, it is important that the end point of a kiln firing run be determined accurately. Overheating may cause damage to both the kiln and its contents. Underheating may mean that the ceramic ware has been insufficiently fired.

The problem is most typically solved at present by using cone-shaped ceramic atricles commonly referred to as "pyrometric cones". These cones are so shaped and composed of appropriate material as to bend or deform when a specific kiln temperature is reached. The composition of these cones may be varied so that a range of cones can be produced, each of which will deform at a different specific temperature ("pyrometric cone temperature").

The pyrometric cones are typically associated with a weight and microswitch arrangement within a kiln, so that deformation of the cone will cause the weight to trip the microswitch and thereby shut-off the kiln. However, the chance of over-firing remains because this control system depends on the physical placement of the cone within the tripping mechanism and within a kiln. For example, overfiring may occur if the weight (which trips the microswitch) is blocked from its proper movement, or if the kiln is accidentally bumped during a firing cycle, or if the cone sticks to its metal support rods, etc.

The general problem of controlling a kiln firing cycle without the use of pyrometric cones has been approached heretofore, as for example, in U.S. Pat. No. 3,901,437 (1975) to Harkins and U.S. Pat. No. 4,114,024 (1978) to Donner. These patents disclose entirely electronic means of terminating a kiln firing cycle by preselecting a cycle end point temperature from a continuous range of end point values. However, these patents do not teach apparatus or method for electronically selecting an end point value from among a discrete range of values corresponding directly to standard pyrometric cone temperature values. Actually the cones are usually identified by a number which does not directly reveal the temperature at which deformation occurs. The ceramist is thus faced with the problem of converting these cone values into temperature values expressed in degrees (which he may not have any way of knowing) and then attempting to locate the desired end point temperature value from a continuous range of values. The repeatability of this procedure may be difficult to achieve as well.

The use of a thermocouple for detecting temperature variations within a kiln or furnace is also known in the prior art, for example, U.S. Pat. Nos. 1,775,682, 2,118,642, 2,303,081, 3,494,135, 3,625,421, and 3,952,945. These patents generally disclose the use of a free thermocouple in conjunction with a ware-contacting thermocouple to detect the difference between ambient kiln temperature and ware temperature. However there does not seem to be any use of a ceramic thermocouple housing designed to approximate the internal ceramic ware temperature conditions.

It accordingly is an object of this invention to provide method and apparatus for controlling a kiln firing cycle in which the end point temperature value may be preselected from a discrete range of values corresponding directly to standard pyrometric cone values.

It is another object of this invention to provide means of controlling a kiln firing cycle in which temperature variations within the kiln are detected by a thermocouple encased within ceramic material whose composition and construction is designed to approximate that of ware being fired—i.e., so that temperature variations of the thermocouple actually reflect temperature variations experienced within the ware.

These and other objects and advantages of this invention will be more completely understood from the following detailed description of the presently preferred exemplary embodiment of this invention taken together with the accompanying drawings, of which:

Figure 1:
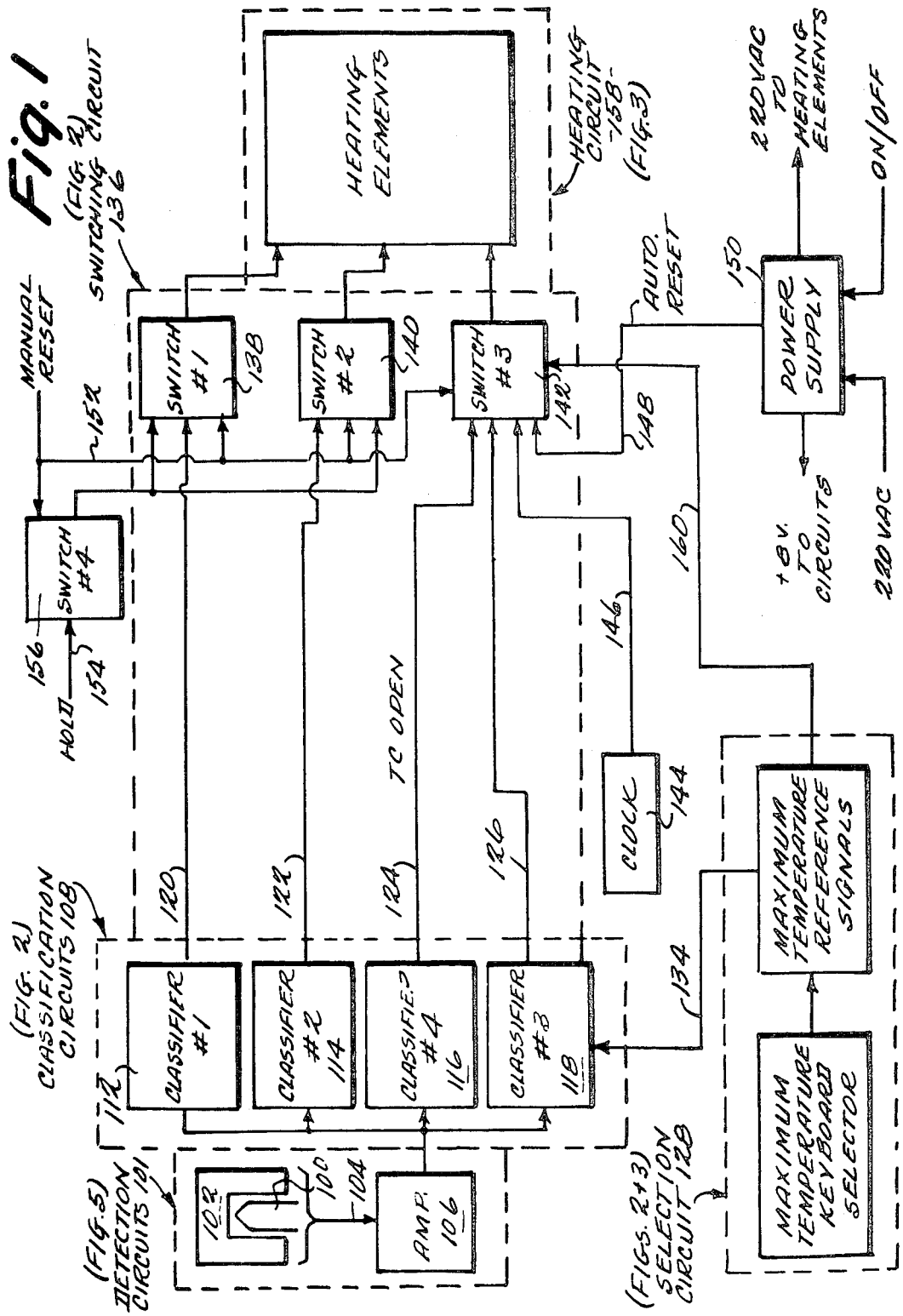
FIG. 1 is a schematic block diagram of an exemplary embodiment of this invention.

As shown in FIG. 1, the presently preferred exemplary embodiment of the apparatus utilizes a thermocouple 100 encased within a ceramic housing 102, so that temperature variations of thermocouple 100 approximate temperature variations in the ceramic ware being fired. Ceramic housing 102 may be constructed of any suitable ceramic material and preferably has a wall thickness approximately equal to one-half (e.g., ⅛ inch) the expected wall thickness of ceramic ware being heated within the kiln. Thermocouple 100 (a conventional chromel-alumel thermocouple) therefore detects a temperature corresponding approximately to the temperature existing within the interior of the ceramic ware, rather than sensing only the ambient kiln air temperature.

An electrical output signal is generated at 104 by thermocouple 100 and presented to a conventional amplifier 106. In turn, its output is presented to classification circuits 108.

Classification circuits 108 may include, for example, four classifiers 112, 114, 116 and 118 capable of generating respectively four output signals on lines 120, 122, 124 and 126 in response to unique corresponding values of input signals from detection circuit 101.

Fourth classifier 116 will produce an output signal on line 124 in response to an input signal corresponding to the electrical "opening" of thermocouple 100.

The value of the input signal which causes third classifier 118 to produce an output signal on line 126 may be selectively determined by selection circuit 128. Selection circuit 128 consists of a maximum temperature keyboard selector and a maximum temperature reference signal generator. The maximum temperature reference signal generator is capable of producing a plurality of discrete predetermined reference signals which act as an input on line 134 to third classifier 118. The discrete value of reference signal selected by selection circuit 128 will determine triggering of the third classifier 118.

There is a unique 1 to 1 correspondence between each of the plurality of discrete predetermined reference signals on line 134 and a predetermined pyrometric cone temperature (preferably as established by the National Bureau of Standards). Keyboard 130 allows the operator of the device to preselect one of the plurality of discrete predetermined reference signals to be output from selection circuit 128. In the preferred embodiment of the invention, the maximum temperature reference signal generator contains sixteen discrete predetermined reference signal values, and the maximum temperature keyboard selector contains an array of sixteen keys, each key corresponding to one predetermined reference signal value and being identifiable by the operator by the same designation used for the corresponding standard pyrometric cones.

The plural outputs of classification circuit 108 are presented to switching circuit 136 which includes: first switch 138 which closes in response to the first output signal on line 120; second switch 140 which closes in response to the second output signal on line 122; and third switch 142 which opens in response to the third output signal on line 126. In addition third switch 142 will open in response to the fourth output signal on line 124, corresponding to the electrical "opening" of thermocouple 100.

The opening of third switch 142 may also be triggered by a signal on line 146 from alarm clock 144. Alarm clock 144 is an electronic digital alarm clock conventionally known in the art and includes a fast-set mechanism, a slow-set mechanism, an alarm display, an on/off switch, and an alarm select.

Third switch 142 is closed by an autoreset signal on line 148 which is generated whenever power supply 150 is turned on. First switch 138, second switch 140, and third switch 142 may also simultaneously be opened by a manual reset signal on line 152. In addition first switch 138 and second switch 140 may be opened by a manually generated "hold" signal on line 154 via a fourth switch 156.

The output of switching circuit 136 is presented to heating circuit 158. Heating circuit 158 may include a plurality of heating elements which may be electrically rearranged in response to the opening and closing of switches 138, 140 and 142, each such electric rearrangement corresponding to a different heating mode within the kiln.

In the preferred embodiment of the invention, four such heating modes are possible. In the first heating mode corresponding to a low ambient kiln temperature, first switch 138 and second switch 140 are open while third switch 142 is closed. In the second heating mode, corresponding to a medium ambient kiln temperature, first switch 138 and third switch 142 are closed while second switch 140 is opened. In the third heating mode, corresponding to a high ambient kiln temperature, switches 138, 140 and 142 are all closed. In the fourth heating mode none of the heating elements of heating means 158 is in operation. This occurs whenever third switch 142 is opened.

In operation, a ceramic ware is placed within the kiln which also contains thermocouple 100 encased within ceramic material 102. When the power supply 150 is turned on, third switch 142 is automatically opened by the auto-reset signal on line 148 thus clearing the heating circuit 158. The kiln operator next selects a desired one of the available discrete maximum kiln temperatures from the maximum temperature reference signal generator by means of the keyboard selector. The depressing of any key on the keyboard also generates a signal on line 160 which resets third switch 142 so that heating circuit 158 is initially in the first mode of operation with third switch 142 closed and first switch 138 and second switch 140 open.

As the temperature within the kiln increases so does the internal temperature of ceramic housing 102. Thermocouple 100 detects this temperature increase and the corresponding output signal from amplifier 106 varies accordingly.

When ceramic material 102 reaches a first preset temperature value, first classifier 110 generates a first output signal on line 120. First output signal on line 120 will, in turn, cause first switch 138 to close, placing heating circuit 158 into the second mode of operation. In this mode, the first switch 138 and third switch 142 are both closed, while the second switch 140 remains open.

The temperature of ceramic housing 102 will continue to increase until a second preset temperature value is attained. At this point second classifier 112 generates second output signal on line 122. Second output signal on line 122 will, in turn, cause second switch 140 to close, thereby causing heating circuit 158 to transition from the second mode of operation to the third mode. In this third mode, first switch 138, second switch 140 and third switch 142 are all closed.

The temperature within the kiln continues to increase in this mode until third classifier 116 generates the third output signal on line 126. Third output signal 126 in turn causes third switch 142 to open, thereby terminating all heating operations within the kiln.

Figure 5:
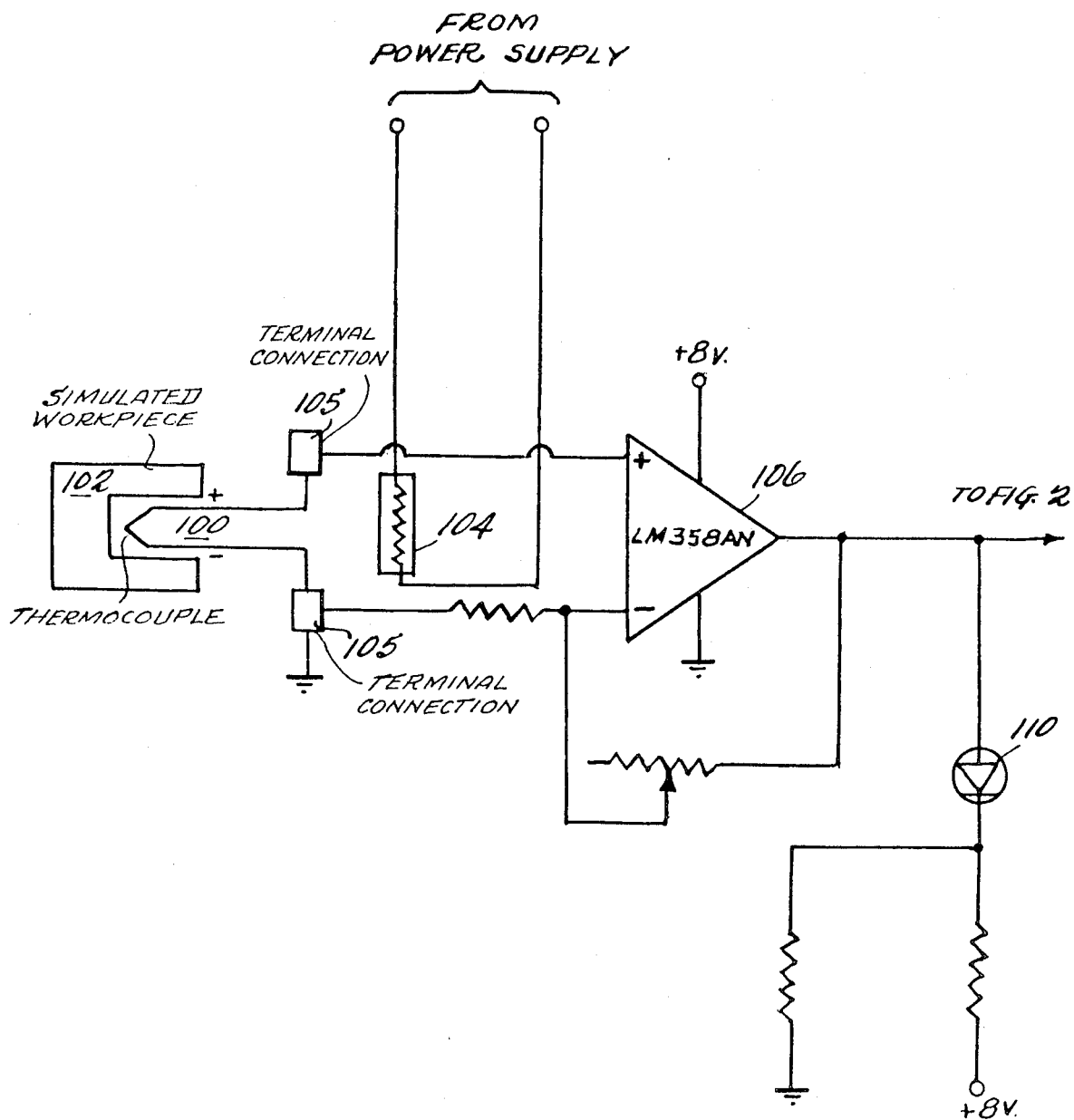
FIG. 5 is a more detailed diagram of the temperature detection circuitry shown in FIG. 1.

As shown in more detail at FIG. 5, the preferred exemplary embodiment utilizes a thermocouple 100 encased within ceramic housing 102. The thermocouple 100 measures the temperature variations with the ceramic housing 102, which in turn approximately correspond to internal temperature variations of ceramic ware being fired. The thermocouple terminal connections 105 are associated with a heating element 104, which is used to preset the equivalent of a cold junction at the thermocouple terminal connections. The thermocouple EMF is transmitted to a conventional variable (but preset) gain integrated circuit amplifier 106. The output of amplifier 106 is related to the temperature within ceramic housing 102 as measured by the themocouple 100 and therefore provides an instantaneous indication of the aproximate internal ware temperature during the heating process.

If thermocouple 100 electrically opens during operation, the output of amplifier 106 will be strongly negative. This signal will be visually indicated by the LED 110 to indicate a thermocouple open circuit.

Figure 2:
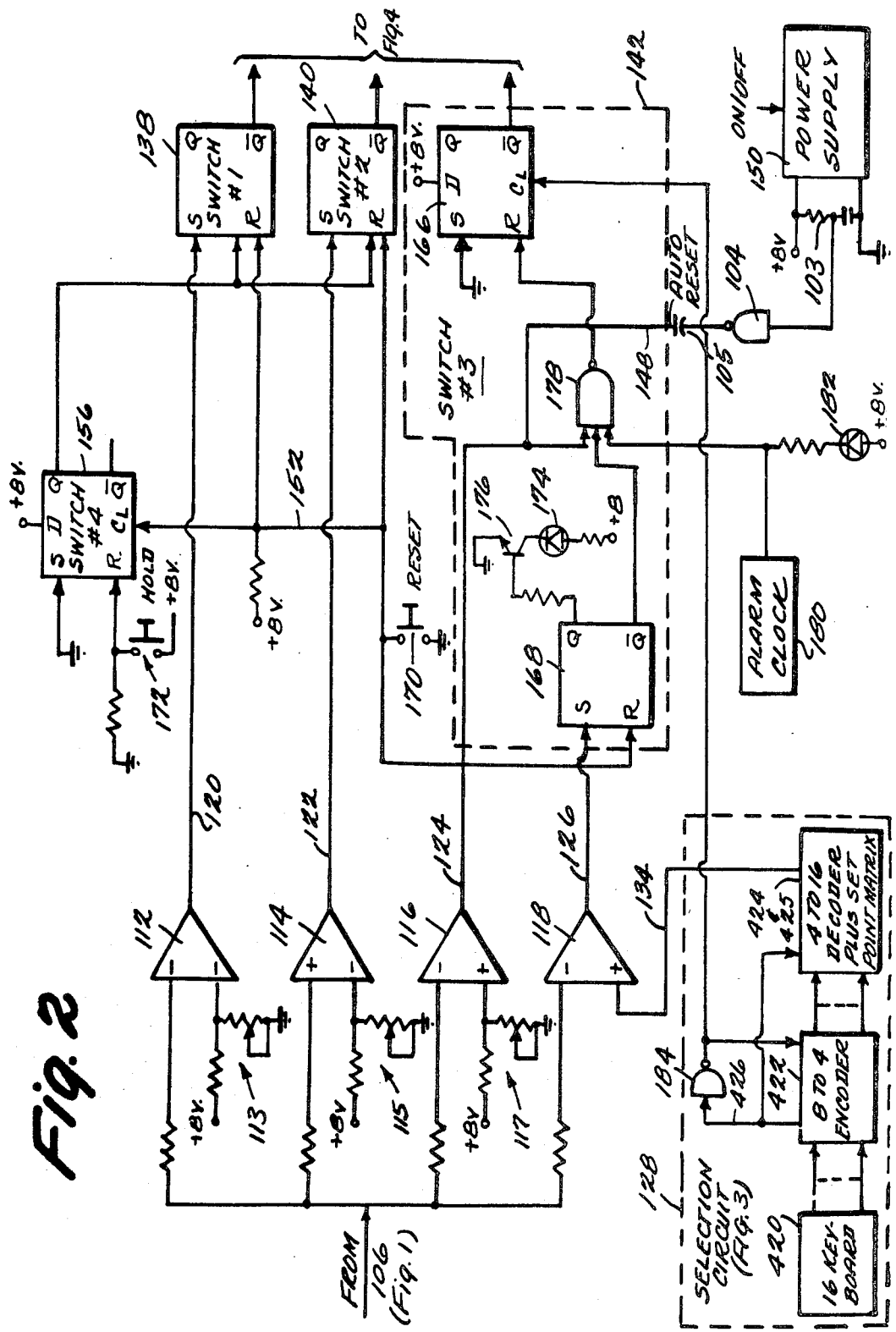
FIG. 2 is a more detailed diagram of the classification circuitry shown in FIG. 1.

Referring now to FIG. 2, the output signal from amplifier 106 is presented to one input of each of comparators 112, 114, 116 and 118. The other input of comparators 112, 114 and 116 are respectively connected to preset reference voltage circuits 113, 115 and 117, while the other input of comparator 118 is connected to selection circuits 128. The polarity of the input terminal connections for the comparators 112 and 114 are chosen so as to provide low level output therefrom until the input from amplifier 106 rises above the respectively corresponding reference voltage. The polarity of the input terminal connections for comparators 116 and 118 are reversely connected so as to provide a high output voltage level as long as the input from amplifier 106 is below the reference voltage level.

The reference voltage input to comparator 112 is present so as to define a particular desired temperature value. In the presently preferred exemplary embodiment this first set point temperature value is aproximately 350° F. The reference voltage input to comparator 114 is likewise chosen so as to define a second desired set point temperature of the ceramic housing 102. In the preferred exemplary embodiment this temperature value is approximately 750° F. The reference voltage input to comparator 116 is chosen so as to define an input signal from amplifier 106 corresponding to the opening of thermocouple 100. The reference voltage input to comparator 118 is chosen to as to define a third set point temperature value which will also be the maximum temperature to be attained in the heating cycle.

Figure 3:
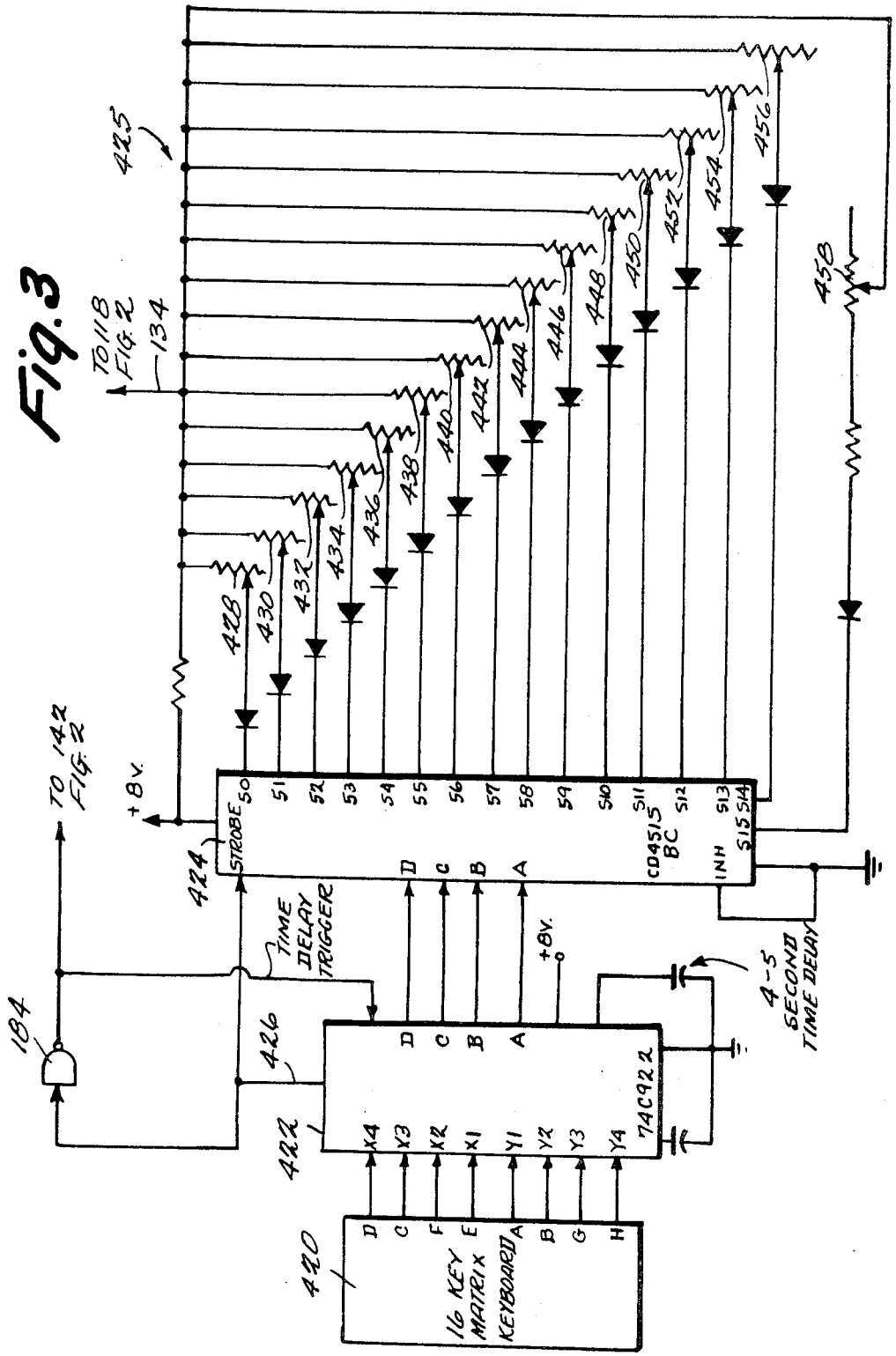
FIG. 3 is a more detailed diagram of the selection circuitry shown in FIG. 1.

Referring now to FIGS. 2 and 3, the reference input voltage of comparator 118 is selected by matrix keyboard 420, encoder 422, decoder 424 and a set point matrix 425. Keyboard 420 has at least 16 keys in the preferred embodiment, each key respectively corresponding to one pyrometric cone designation (and hence temperature) as established by the National Bureau of Standards. The keyboard may be of any conventional design known in the art; however, in the preferred embodiment the keyboard unit is a 4×4 keyboard manufactured by Grayhill, Inc. Encoder 422 is provided in order to electrically encode the 8 line output of keyboard 420 into a parallel four bit encoded signal which is conventionally coupled to decoder unit 424. Depressing any keyboard on keyboard matrix 420 also generates an output signal along line 426, which is connected to the strobe input of decoder 424. The strobe pulse latches the decoder 424 in an output state corresponding to the then existing state of its coded input. Thus decoder 424 selects one of 16 preset reference voltage circuits 428 through 458 by lowering the voltage on a corresponding one of its 16 output lines S0–S15. Each of these discrete preset circuits 428–458 corresponds uniquely to one of the 16 keys on matrix keyboard 420. The reference voltage defined by each circuit 428–458 is chosen so as to define a maximum temperature value corresponding to a pyrometric cone equivalent temperature.

As seen in FIG. 2, switches 138 and 140 are RS flip-flops which are conventionally known in the art. Switch 156 is a D-type flip-flop also known in the art and switch 142 comprises both an RS flip-flop 168 and a D-type flip-flop 166.

Flip-flop 138 is set by the output of comparator 112 and is reset either by the Q output of flip-flop 156 or by manual reset switch 170. Thus, when the sensed temperature passes through its first set point temperature value, Q of flip-flop 138 will go low. In a similar manner, flip-flop 140 is set by the output of comparator 114 and is reset either by the Q output of flip-flop 156 or by manual reset switch 170. Accordingly, a low Q output of flip-flop 140 corresponds to the passing of the second set point temperature value. Activation of the manual hold switch 172 will reset flip-flop 156, thereby causing its Q output to go low and thus resetting flip-flops 138, 140.

Flip-flop 168 is set by the output of comparator 118 and is reset by manual reset switch 170. The Q output of flip-flop 168 will accordingly transition high when the maximum set point temperature is reached. Attainment of this maximum end point temperature is visually indicated by LED 174 which is connected to the Q output of flip-flop 168 via driver transistor 176. The $\overline{Q}$ output of flip-flop is presented to 168 one input of NAND gate 178. The other inputs of NAND gate 178 are connected to the output of comparator 116, the alarm output of alarm clock 180 and to auto-reset line 148.

Alarm clock 180 is an electronic digital alarm clock conventionally known in the art, and includes a fast-set switch, a slow-set switch, an alarm display, an on-off switch, and an alarm select switch. LED 182 provides a visual indication that the alarm of alarm clock 180 has been armed.

The output of NAND gate 178 resets flip-flop 166 whose low Q output therefore corresponds to any one of four distinct events: (a) the opening of thermocouple 102 (producing a low output from comparator 116), (b) reaching of the maximum set point temperature (producing a low output from comparator 118 which, in turns, sets flip-flop 168 and causes is $\overline{Q}$ output to go low), (c) the alarm triggering of alarm clock 180 (a low output state), or (d) the initial turn-on of power supply 150 via RC network 103, NAND gate 104 and capacitor 105. Flip-flop 166 is cleared by receiving a signal from NAND gate 184, which occurs in response to the depression of any key on matrix keyboard 120.

Figure 4:
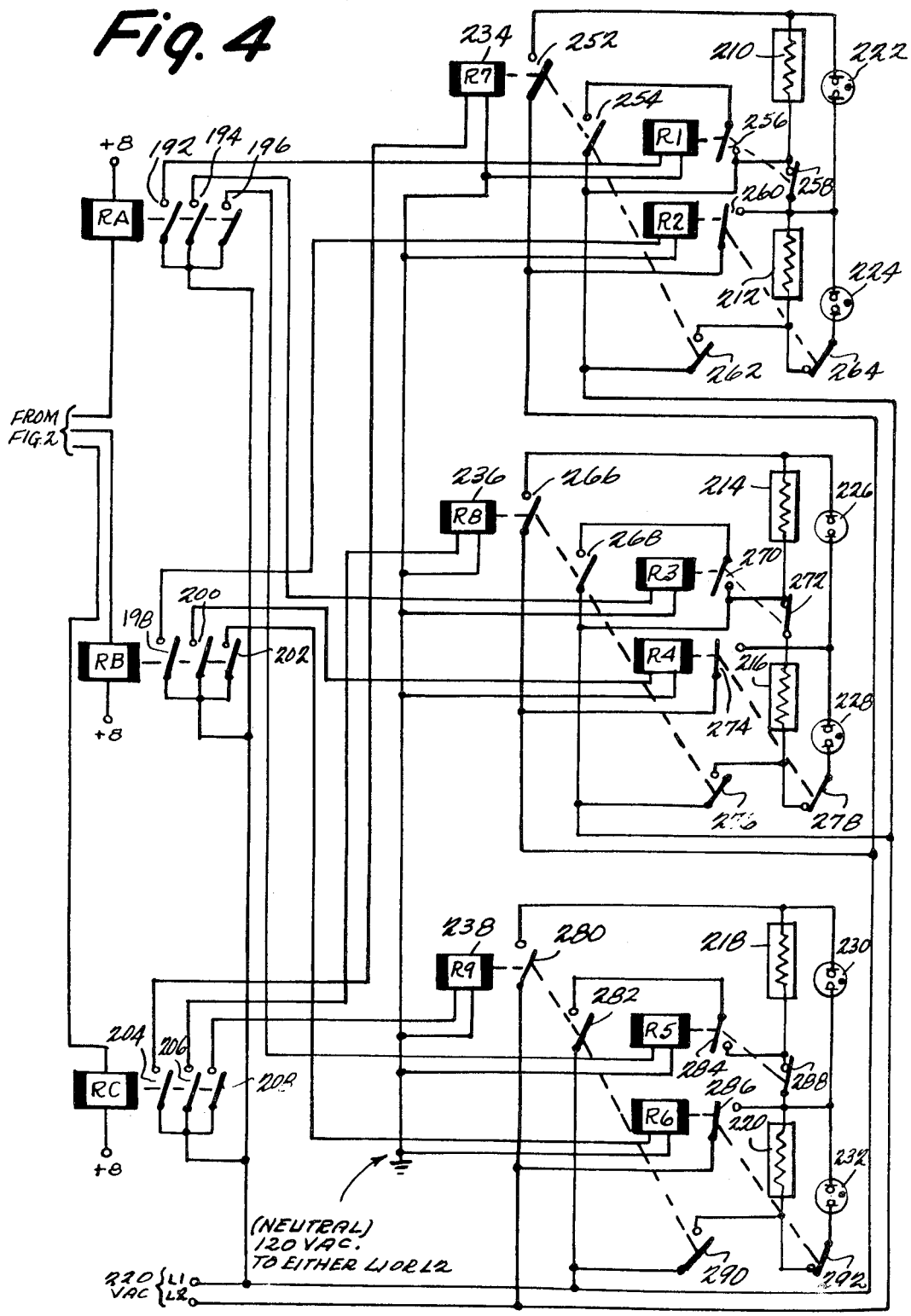
FIG. 4 is more detailed diagram of the heating circuitry shown in FIG. 1.

Referring now to FIG. 4, it will be seen that the $\overline{Q}$ outputs of flip-flops 138, 140 and 166 are connected respectively to the coils of relays RA, RB and RC which, in turn, control the heating elements 210, 212, 214, 216, 218, 220. Thus a low $\overline{Q}$ output of flip-flop 138 causes relay RA to close NO contacts 192, 194 and 196 which, in turn operate the coils of relays R1, R3 and R5. The corresponding NO contacts 256, 270 and 284 are thus closed at the same time that NC contacts 258, 272 and 288 are opened. In a similar manner, a low $\overline{Q}$ output of flip-flop 140 will cause relay RB to close NO contacts 198, 200 and 202, thereby triggering the coils of relays R2, R4 and R6 which will close NO contacts 260, 274, and 286 while opening NC contacts 264, 278 and 292. A low $\overline{Q}$ output form flip-flop 166 will cause relay RC to close NO contacts 204, 206 and 208, which will trigger relays R7, R8 and R9 thereby causing NO contacts 252, 254, 262, 266, 268, 276, 280, 282, 290 to close.

The relay contact connections illustrated in FIG. 4 thus establish four unique electrical configurations of heating elements 210, 212, 214, 216, 218 and 220, corresponding to four distinct kiln heating modes. In the first mode, relay RC is operative so that contacts 204, 206 and 208 are closed, while relays RA and RB are inoperative. In ths first mode, corresponding to a low heating mode, all heating elements 210 through 220 are in operation. However, the pair of heating elements 210 and 212 are connected in series with each other across 220 VAC, as are the heating element pair 214 and 216 as well as the heating element pair 218 and 220.

In the second heating mode, corresponding to a medium heating mode, relays RC and RA are both operative while relay RB remains inoperative. In this heating mode only heating elements 210, 214 and 218 are in operation, these three elements now being connected in parallel across 220 VAC.

In the third (high) heating mode, relays RC, RA and RB are all activated. In this third mode, all heating elements 210 through 220 are in operation, all these elements now being connected in parallel across 220 VAC.

The fourth heating mode corresponds to the termination of kiln heating when all heating elements are turned off. This occurs whenever relay RC is caused to be inoperative regardless of the state of relays RA and RB.

In operation, this exemplary embodiment operates as follows. A ceramic ware is placed within the kiln and power supply 150 is turned on, causing auto-reset circuit 103, 104, 105 to reset flip-flop 166. A maximum kiln temperature is selected from among the pyrometric cone equivalent temperature values available on matrix keyboard 120. The depressing of any key on matrix keyboard 120 also resets flip-flop 166 so that in either of two ways, the heating circuit is initially placed in the first mode of operation.

As the kiln temperature increases, thermocouple 100 generates a signal which is presented to amplifier 106, the output of which is simultaneously presented to the array of comparators 112, 114, 116 and 118.

When a temperature of approximately 350° F. is reached, the output of comparator 112 goes positive, causing a low $\overline{Q}$ output of flip-flop 138. This low $\overline{Q}$ output will operate relay RA and thereby place the heating circuit into the second (medium heat) mode.

Thereafter, the temperature increases until it reaches a value of approximately 750° F. At this point the output of comparator 114 will go positive, causing a low $\overline{Q}$ output of flip-flop 140 which operates relay RB. At this point all three relays RA, RB and RC are in operation and the heating elements are in the third (high heat) mode of operation.

The temperature within the kiln thus continues to increase until it reaches a temperature corresponding to the temperature preselected from the plurality of end point temperatures available on matrix keyboard 120. At this maximum temperature, the output from comparator 118 will go negative and cause a low $\overline{Q}$ output of flip-flop 168 and a high $\overline{Q}$ output from flip-flop 166 which will terminate the operation of relay RC and thereby terminate whole heating operation within the kiln.

While only one exemplary embodiment has been described in detail, those skilled in the art will appreciate that many variations and modifications to this embodiment are possible without materially departing from the novel and advantageous features of this invention. Accordingly, all such modifications and variations are intended to be included in the scope of the appended claims.

What is claimed is:

1. A kiln temperature controller for controlling the temperature of a kiln while firing ceramic ware having predetermined wall thickness, said controller comprising:

a temperature sensor housed within ceramic material having a wall thickness approximately equal to one-half the expected wall thickness of ceramic ware to be fired in the kiln so as to approximately sense the internal temperature of the ceramic ware being fired in said kiln, and kiln heating means connected to be controlled by said temperature sensor.

* * * * *